(12) United States Patent
Hake

(10) Patent No.: US 11,879,613 B2
(45) Date of Patent: Jan. 23, 2024

(54) OPTICAL LENS SYSTEM FOR VEHICLE LIGHTING APPLICATIONS

(71) Applicants: Ningbo Geely Automobile Research & Development Co., Ltd., Ningbo (CN); Zhejiang Geely Holding Group Co., Ltd., Zhejiang (CN)

(72) Inventor: Joel Hake, Kållered (SE)

(73) Assignees: NINGBO GEELY AUTOMOBILE RESEARCH & DEV. CO., LTD., Ningbo (CN); ZHEJIANG GEELY HOLDING GROUP CO., LTD., Zhejiang (CN)

(*) Notice: Subject to any disclaimer, the term of this patent is extended or adjusted under 35 U.S.C. 154(b) by 0 days.

(21) Appl. No.: 18/120,221

(22) Filed: Mar. 10, 2023

(65) Prior Publication Data
US 2023/0213163 A1 Jul. 6, 2023

Related U.S. Application Data

(63) Continuation of application No. PCT/CN2021/119895, filed on Sep. 23, 2021.

(30) Foreign Application Priority Data

Oct. 16, 2020 (EP) .................................... 20202289

(51) Int. Cl.
*F21V 8/00* (2006.01)
*F21S 43/239* (2018.01)
(Continued)

(52) U.S. Cl.
CPC ........... *F21S 43/239* (2018.01); *F21S 43/245* (2018.01); *F21S 43/249* (2018.01); *G02B 6/0036* (2013.01); *G02B 6/0068* (2013.01)

(58) Field of Classification Search
CPC ..... G02B 6/0036; G02B 6/0068; F21S 43/239; F21S 43/249
See application file for complete search history.

(56) References Cited

U.S. PATENT DOCUMENTS 5,718,497 A * 2/1998 Yokoyama ........... G02B 6/0036
362/330
2005/0231982 A1 10/2005 Kajiura
(Continued)

FOREIGN PATENT DOCUMENTS

| CN | 103460092 A | 12/2013 |
| CN | 108091738 A | 5/2018 |

(Continued)

OTHER PUBLICATIONS

International Search Report from corresponding International Application No. PCT/CN2021/119895, dated Dec. 21, 2021, 3 pages.

*Primary Examiner* — Robert J May
(74) *Attorney, Agent, or Firm* — Tucker Ellis LLP

(57) ABSTRACT

An optical lens system for vehicle lighting includes a light guide with optical elements arranged as indentations in a light impacting surface of the lens body. The optical elements are configured with a truncated cone section arranged within the lens body in connection to the light impacting surface, and a rounded cap section arranged within the lens body in connection to the truncated cone section. A base surface of the rounded cap section is coincident with a top surface of the truncated cone section. The truncated cone section has an outer surface and a base surface, and the rounded cap section includes an outer surface. A cross-sectional transition between the outer surface of the truncated cone section and the outer surface of the rounded cap section is non-linear.

20 Claims, 7 Drawing Sheets

(51) Int. Cl.
*F21S 43/249* (2018.01)
*F21S 43/245* (2018.01)

(56) References Cited

U.S. PATENT DOCUMENTS

| | | |
|---|---|---|
| 2009/0073721 A1 | 3/2009 | Kamikatano |
| 2010/0079978 A1 | 4/2010 | Nakamura |
| 2010/0288614 A1 | 11/2010 | Ender |
| 2013/0063980 A1 | 3/2013 | Ender |
| 2013/0128620 A1 | 5/2013 | Kosuge |
| 2013/0294064 A1 | 11/2013 | Mccaughan |
| 2014/0321136 A1 | 10/2014 | Reuschel |
| 2015/0029741 A1 | 1/2015 | Lee |
| 2019/0302341 A1 | 10/2019 | Chen |

FOREIGN PATENT DOCUMENTS

| | | |
|---|---|---|
| CN | 108136953 A | 6/2018 |
| JP | H10172318 A | 6/1998 |
| JP | H10227918 A | 8/1998 |
| JP | 2002297069 A | 10/2002 |
| JP | 2010027573 A | 2/2010 |
| WO | 9506889 A1 | 3/1995 |
| WO | 2010055907 A1 | 5/2010 |
| WO | 2013159687 A1 | 10/2013 |
| WO | 2017/060625 A1 | 4/2017 |

\* cited by examiner

OPTICAL LENS SYSTEM FOR VEHICLE LIGHTING APPLICATIONS

RELATED APPLICATION DATA

This application is a continuation of International Patent Application No. PCT/CN2021/119895, filed Sep. 23, 2021, which claims the benefit of European Patent Application No. 20202289.3, filed Oct. 16, 2020, the disclosures of which are incorporated herein by reference in their entireties.

TECHNICAL FIELD

The present disclosure relates to an optical lens system for vehicle lighting applications, such as a vehicle lighting unit, where the system comprises a lens body and a light source unit configured for emitting light into the lens body. The lens body comprises a light inlet surface arranged to receive incident light from the light source unit, a light output surface configured to emit the light received from the first light source unit through the first light inlet surface, and a light impacting surface. The light impacting surface and the light output surface are oppositely arranged in relation to each other and connected by the first light inlet surface. The light impacting surface comprises at least one first optical zone configured for redirecting the incident light from the first light inlet surface toward the light output surface, where the at least one first optical zone is formed by a plurality of optical elements. The optical elements are arranged as indentations in the light impacting surface of the lens body. The disclosure further relates to a vehicle comprising the optical lens system, and a vehicle lighting unit comprising the optical lens system.

BACKGROUND

Vehicle lighting systems with vehicle lighting units, such as for example taillights and position lights are used on vehicles to meet safety regulations. The vehicle lighting systems or units commonly comprise optical lens systems for establishing desired light outputs in different applications. The lighting systems or units are often integrated in the design of the vehicle to achieve an attractive appearance and establish a specific identity of the vehicle, for example through the design of light patterns. The optical lens systems are used for guiding light from light sources to light emitting surfaces, such as for example in taillights, position lights, ambient lights, lighting features in general, or similar vehicle lighting structures. In today's vehicle applications, there are high demands on the aesthetic appearance and compact design of lighting structures, as well as the light emitting properties needed to meet safety regulations. One common issue when designing a vehicle lighting structure is to achieve an even or homogenous light pattern in the light emitting surface and to achieve an even or homogeneous light distribution from the light emitting surface when viewed from different angles. This is especially complicated when the light emitting surface has a non-planar configuration. There is thus a need for an improved vehicle lighting system.

SUMMARY

An object of the present disclosure is to provide an optical lens system for vehicle lighting applications, a vehicle comprising the optical lens system, and a vehicle lighting unit comprising the optical lens system, where the previously mentioned problems are avoided. This object is at least partly achieved by the features of the independent claim. The dependent claims contain further developments of the optical lens system and the vehicle lighting unit.

The disclosure concerns an optical lens system for vehicle lighting applications, where the system comprises a lens body and a first light source unit configured for emitting light into the lens body. The lens body comprises a first light inlet surface arranged to receive incident light from the first light source unit, a light output surface configured to emit the light received from the first light source unit through the first light inlet surface, and a light impacting surface. The light impacting surface and the light output surface are oppositely arranged in relation to each other and connected by the first light inlet surface. The light impacting surface comprises at least one first optical zone configured for redirecting the incident light from the first light inlet surface toward the light output surface, where the at least one first optical zone is formed by a plurality of optical elements. The optical elements are arranged as indentations in the light impacting surface of the lens body. The optical elements are configured with a truncated cone section arranged within the lens body in connection to the light impacting surface, and a rounded cap section arranged within the lens body in connection to the truncated cone section. A base surface of the rounded cap section is coinciding with a top surface of the truncated cone section. The truncated cone section comprises an outer surface and a base surface, and the rounded cap section comprises an outer surface, and a cross-sectional transition between the outer surface of the truncated cone section and the outer surface of the rounded cap section is non-linear.

Advantages with these features are that the optical lens system through the design of the optical elements in the lens body is providing a compact construction that can meet safety regulations and high demands on the aesthetic appearance of the lighting structure. The construction of the system is establishing an even or homogenous light pattern in the light output surface, and an even or homogenous light distribution without visible light intensity fluctuations from the light output surface when viewed from different angles. The truncated cone section is reflecting the incident light from the light source unit, and the rounded cap section is spreading the light towards the light output surface for a homogenous light distribution from the lens body. The ratio between the truncated cone section and the rounded cap section is balancing the light intensity and homogeneity of the light distributed from the lens body. The solution is providing an optical system that can be applied widely on lenses, inner lenses and optical elements in all interior and exterior lighting applications in a vehicle, where a nice homogeneous look with enough efficiency to fulfil legal requirements is achieved. The system can be used in different lit-up vehicle parts, such as taillights, position lights, ambient light, and lighting features in general, and through the arrangement with the optical elements, the system can be made almost invisible when not lit-up. The solution will greatly help the designing of lighting applications, and the lens body can be made scalable for different lighting applications. The lens body can with the optical elements be designed with see-through effects for an attractive vehicle lighting design and the size of the indentations forming the optical elements in the light impacting surface of the lens body may be varied for different see-through effects. A smaller indentation will establish a better see-through effect of the lens body. The system may further enable reduction of the number of parts used in the vehicle, leading to cost reductions.

According to an aspect of the disclosure, the cross-sectional transition between the outer surface of the truncated cone section, and a tangent line to the outer surface of the rounded cap section in a transition point where the base surface of the rounded cap section is coinciding with the top surface of the truncated cone section, is non-linear. The non-linear cross-sectional transition of the optical elements is providing a redirection of the incident light for establishing the desired homogenous light pattern in the light output surface. The homogenous light distribution is preventing visible light intensity fluctuations from the light output surface when viewed from different angles.

According to another aspect of the disclosure, the cross-sectional transition between the outer surface of the truncated cone section and the tangent line is forming an outer transition angle less than 180°. With the configuration of the optical elements with a truncated cone section and a rounded cap section, suitable outer transition angles are greater than 0° and less than 180° and depends on the configuration of the truncated cone section and the rounded cap section.

According to an aspect of the disclosure, the outer transition angle is in the range 3°-177°, preferably 113°-177°. These ranges are providing efficient light distribution properties. The range 113°-177° has been found suitable for lens bodies made of different materials, such as polymethyl methacrylate (PMMA), polycarbonate (PC), a mix of polycarbonate (PC) and acrylonitrile butadiene styrene (ABS), silicone, or any other suitable plastic or other material having transparent properties. If using a flexible material, such as silicone, the lens body could be formed into a desired shape.

According to another aspect of the disclosure, a base surface of the truncated cone section is arranged in connection to the light impacting surface. The arrangement of the base surface of the truncated cone section in connection to the light impacting surface is suitable from both a light distribution and manufacturing perspective.

According to an aspect of the disclosure, the rounded cap section is configured as a spherical cap section. The spherical cap section is providing an efficient distribution of the incident light and is simple in construction.

According to a further aspect of the disclosure, the truncated cone section is having a circular base surface and a circular top surface. The circular top surface is arranged within the lens body. The circular configurations have shown to be efficient for a homogenous light distribution in the lens body and are simple in construction when manufacturing the lens body.

According to an aspect of the disclosure, the optical elements are configured for redirecting the incident light from a first light flow direction to a second light flow direction. The optical elements are thus redirecting the incident light from the light inlet surface to the light output surface.

According to another aspect of the disclosure, the system comprises the first light source and a second light source. The lens body comprises the first light inlet surface for the first light source unit and a second light inlet surface for the second light source unit, where the first light inlet surface and the second light inlet surface are oppositely arranged in relation to each other and connected by the light impacting surface and the light output surface. The light impacting surface comprises a first optical zone and a second optical zone formed by the plurality of optical elements. With this arrangement, the optical zones can be arranged for an efficient light distribution with an attractive light pattern design.

According to a further aspect of the disclosure, the first optical zone is arranged in connection to the first light source unit, and the second optical zone is arranged in connection to the second light source unit. The arrangement of the respective optical zones is providing an efficient redistribution of the incident light from the respective light source units, for a homogenous light distribution from the lens body.

According to an aspect of the disclosure, the first optical zone of the light impacting surface is defined by the plurality of optical elements, where the plurality of optical elements in the first optical zone are arranged in a hexagonal-shaped pattern. Alternatively, the first optical zone and the second optical zone of the light impacting surface are defined by the plurality of optical elements, where the plurality of optical elements in the first optical zone and the second optical zone are arranged in a hexagonal-shaped pattern. These features are providing an optical pattern that can be applied widely on lenses, inner lenses and optical elements in all interior and exterior lighting applications in a car, where a nice homogeneous look with enough efficiency to fulfil legal requirements is achieved.

According to another aspect of the disclosure, the hexagonal-shaped pattern is formed by pairwise arranged optical elements. The pairwise arrangement is establishing a visually attractive design of the optical zone, where the pairwise arranged optical elements further are securing an efficient light distribution.

According to a further aspect of the disclosure, the hexagonal-shaped pattern is formed by the plurality of optical elements arranged in a repeated continuous hexagonal-shaped pattern, which is providing an efficient redistribution of the incident light.

According to an aspect of the disclosure, each hexagon in the hexagonal-shaped pattern comprises a non-filled area. The non-filled area is configured for establishing a see-through effect in the lens body. The see-through effect is further enhancing the attractive design of the system. When the lens body is not lit-up the see-through effect can be used for establishing aesthetically attractive design effects of the system in exterior or interior lighting structures. The size of the indentations forming the optical elements in the light impacting surface of the lens body may be varied for different see-through effects. A smaller indentation will establish a better see-through effect of the lens body. Two or more lens bodies may be arranged after each other for establishing sequential and/or animated three-dimensional light patterns, and this is enabled by the see-through effect of the lens body.

According to another aspect of the disclosure, the lens body comprises a first buffer zone between the first light inlet surface and the first optical zone. Alternatively, the lens body comprises a first buffer zone between the first light inlet surface and the first optical zone, and a second buffer zone between the second light inlet surface and the second optical zone. The buffer zones are securing that the incident light is evenly spread in the lens body before being redirected in the one or more optical zones.

According to a further aspect of the disclosure, each light source unit comprises a plurality of light sources. The plurality of light sources are used for securing the right light input intensity into the lens body and for establishing a homogenous light distribution into the lens body.

The disclosure further concerns a vehicle comprising the optical lens system described above.

The disclosure further concerns a vehicle lighting unit comprising one or more optical lens systems as described above.

According to one aspect of the disclosure, the vehicle lighting unit comprises two or more optical lens systems, where lens bodies of the optical lens systems are arranged after each other and configured for establishing sequential and/or animated three-dimensional light patterns.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1A:
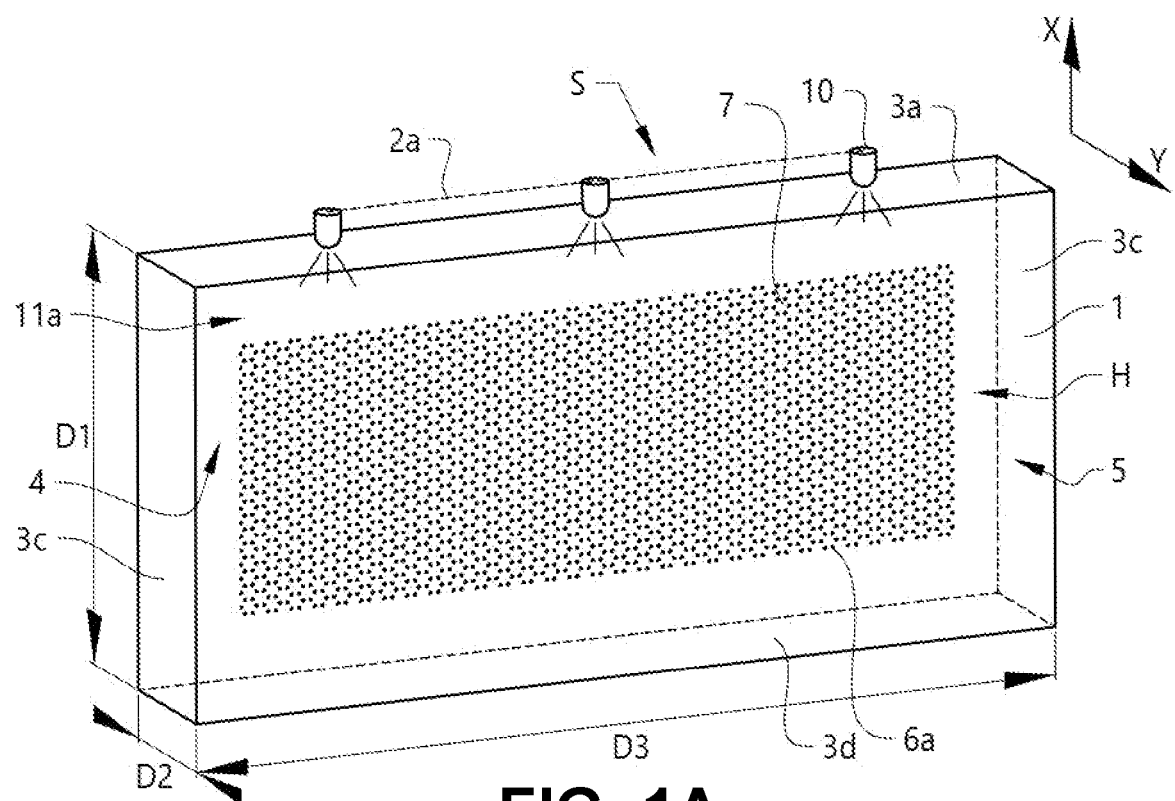
FIGS. 1A-1B show schematically, in a perspective front view and in a side view, an optical lens system according to the disclosure.
Figure 1B:
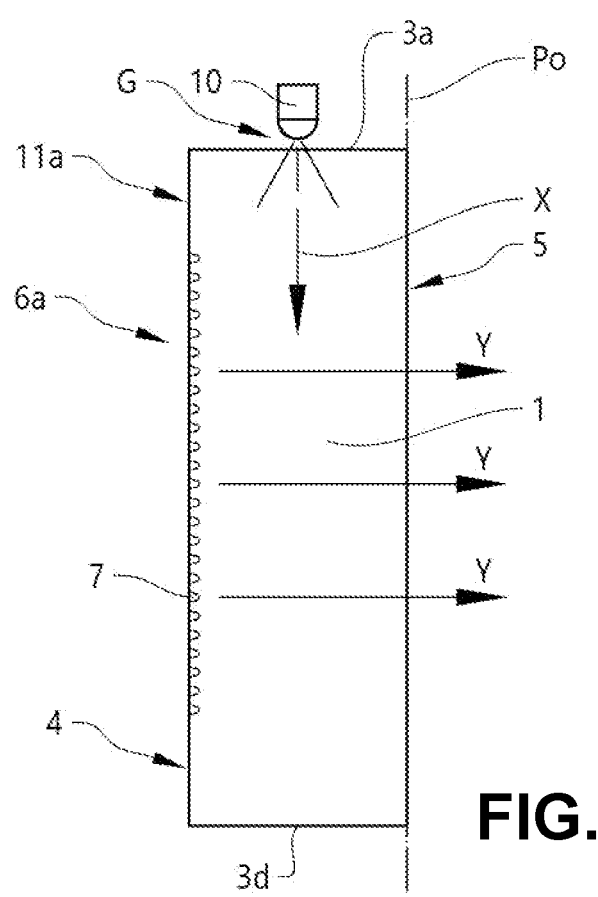

FIGS. 1A-1B schematically shows an embodiment of an optical lens system S for vehicle lighting applications, where the optical lens system may be used in a vehicle lighting unit. The optical lens system S comprises a lens body 1 and a first light source unit 2a configured for emitting light into the lens body 1. The lens body 1 comprises a first light inlet surface 3a arranged to receive incident light from the first light source unit 2a, a light output surface 5 configured to emit the light received from the first light source unit 2a through the first light inlet surface 3a, and a light impacting surface 4. As shown in FIGS. 1A-1B, the light impacting surface 4 and the light output surface 5 are oppositely arranged in relation to each other and connected by the first light inlet surface 3a. The light impacting surface 4 is arranged for redirecting the incident light from the first light inlet surface 3a toward the light output surface 5, as will be further described below. In the illustrated embodiment, the first light inlet surface 3a is arranged as an upper surface of the lens body 1, and the light impacting surface 4 and the light output surface 5 are connected by two oppositely arranged side surfaces 3c. A lower surface 3d, oppositely arranged the first light inlet surface 3a, is further connecting the light impacting surface 4 and the light output surface 5. Upper and lower are in this context referring to the orientation of the surfaces as illustrated in FIGS. 1A-1B. It should be understood that the surfaces may be oriented in other ways if desired. The two side surfaces 3c and the lower surface 3d are arranged as planar surfaces. However, the two side surfaces 3c and the lower surface 3d may have different shapes, and may be arranged as non-planar surfaces. The two side surfaces 3c and the lower surface 3d may further be masked or hidden in a vehicle lighting construction if desired to prevent unnecessary light emissions from the lens body 1.

The lens body 1 may for example have a parallelepiped-like configuration as shown in FIGS. 1A-1B, with a height dimension D1, a width dimension D2, and a length dimension D3. The length dimension D3 may for example be varied to achieve different surface areas of the light output surface 5. If for example, a predetermined height dimension D1 is used in a specific lens body configuration and the length dimension D3 is varied for different designs of the optical lens system S, the light intensity and configuration of the first light source unit 2a to achieve desired properties may depend on the length dimension D3. It should however be understood that the system may be arranged with other suitable shapes, such as for example curved or irregularly shaped configurations, depending on the design of the vehicle or vehicle component.

The light impacting surface 4 comprises at least one first optical zone 6a formed by a plurality of optical elements 7. The at least one optical zone 6a is configured for redirecting the incident light from the first light inlet surface 3a toward the light output surface 5.

In the embodiment shown in FIGS. 1A-1B, the light impacting surface 4 comprises a first optical zone 6a formed by a plurality of optical elements 7. The first light source unit 2a may be of any type or design, and the first light source unit 2a suitably comprises a plurality of light sources 10 arranged at a distance from each other. In FIG. 1A, three light sources 10 are shown, but the first light source unit 2a may comprise only one light source 10, or alternatively two or more light sources 10 depending on the design of the optical lens system S.

As schematically indicated with an arrow in FIG. 1B, the light sources 10 are emitting light into the first light inlet surface 3a of the lens body. The first optical zone 6a of the lens body 1 with the plurality of optical elements 7 is arranged to redirect the incident light from the first light source unit 2a with the light sources 10 from a first light flow direction X to a second light flow direction Y. In this way, the optical elements 7 of the lens body 1 are configured for redirecting the incident light from the first light flow direction X to the second light flow direction Y, where the second flow direction Y is arranged at an angle in relation to the first flow direction X. The lens body 1 is arranged following the first light source unit 2a in the first light flow direction X. The lens body 1 is designed and configured so that an even or homogenous light distribution of the light emitted through the light output surface 5 from the light sources 10 of the first light source unit 2a is achieved. As described above, the lens body 1 comprises the first light inlet surface 3a and the light output surface 5. The first light inlet surface 3a is arranged to receive the incident light from the light sources 10. The light output surface 5 is arranged to emit the light received from the light sources 10 through the first light inlet surface 3a. The light output surface 5 is distributing the emitted light for example to the outside of the vehicle or into the interior compartment of the vehicle. The optical lens system S may further comprise protective sheets, such as an outer lens, covering the light output surface 5 if desired.

The light emitted from the plurality of light sources 10 of the first light source unit 2a is redirected from the first light flow direction X to the second light flow direction Y in the lens body 1, and through the redirection of light flow, a compact design of the optical lens system S is enabled.

Figure 7:
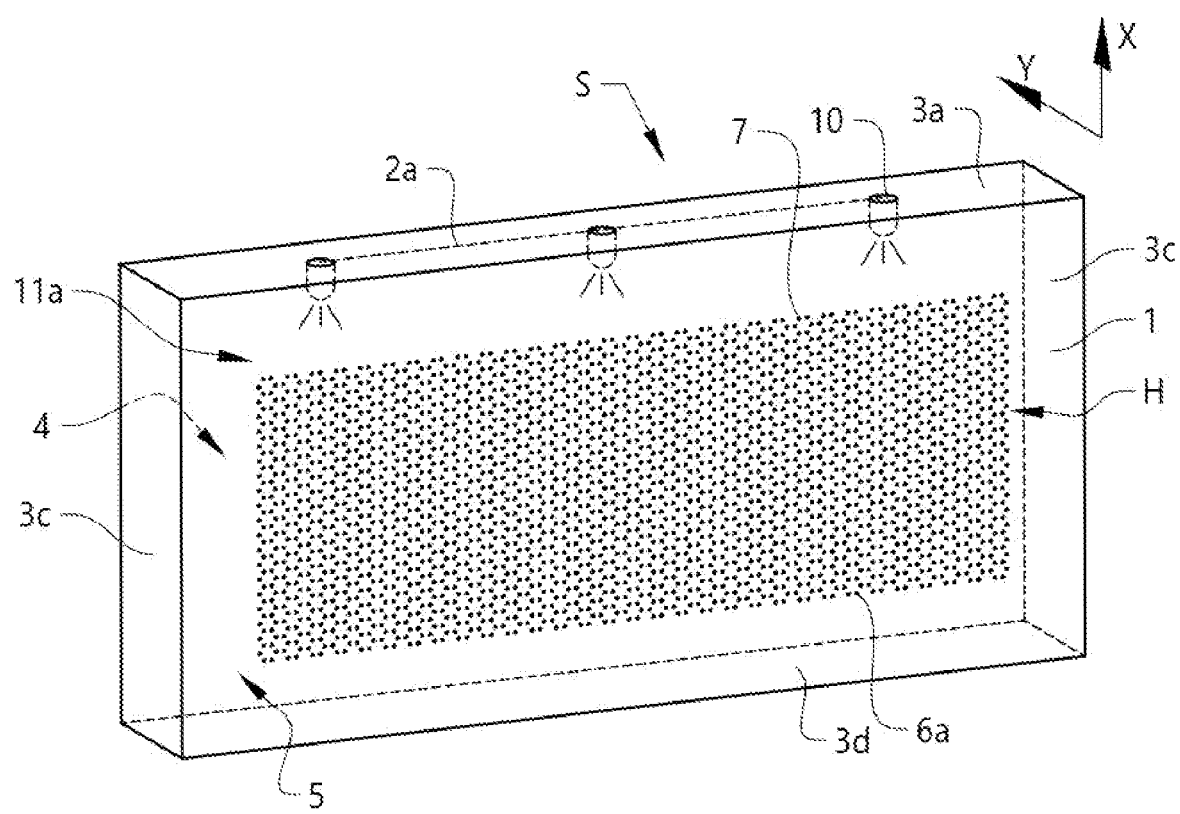
FIG. 7 shows schematically in a perspective rear view, an alternative embodiment of a light source unit of the optical lens system, according to the disclosure.

Each light source 10 is suitably arranged at a small distance from the first light inlet surface 3a, as illustrated in for example FIGS. 1A-1B. A small gap G is thus arranged between each light source 10 and the first light inlet surface 3a, as indicated in FIG. 1B. In an alternative non-illustrated embodiment, the light sources 10 may instead be arranged in direct contact with the first light inlet surface 3a. In another alternative embodiment, the light sources 10 are embedded within the first light inlet surface 3a, as shown in FIG. 7. The optical lens system S illustrated in FIG. 7, has a configuration similar to the one illustrated in FIGS. 1A-1B. Instead of a plurality of light sources, a light guide with one or more light sources or similar arrangement may be used as the first light source unit 2a. The use of a light guide may reduce the number of light sources used.

As described above in connection to FIGS. 1A-1B, the first optical zone 6a is formed by the plurality of optical elements 7, and in this way the extension of the first optical zone 6a is determined by the optical elements 7. The optical elements 7 are arranged as indentations I in the light impacting surface 4 of the lens body 1, and each optical element 7 is thus forming a cavity in the lens body 1. The indentations I formed by the optical elements 7 in the lens body 1 can be achieved when moulding the lens body 1, and the mould used is then prepared with optical element structures.

As shown in FIGS. 1A-1B, the first optical zone 6a is arranged in connection to the first light source unit 2a, and in this embodiment the lens body 1 comprises a first buffer zone 11a between the first light inlet surface 3a and the first optical zone 6a. The first buffer zone 11a is arranged for securing that the incident light from the light sources 10 is evenly spread in the lens body 1 before being redirected in the first optical zone 6a. The area between the first light inlet surface 3a and the first optical zone 6a is defining the first buffer zone 11a, and the first buffer zone 11a may vary in size and shape depending on the design of the lens body 1. The first optical zone 6a and the first buffer 11a zone may have any suitable regular or irregular shapes.

Figure 5:
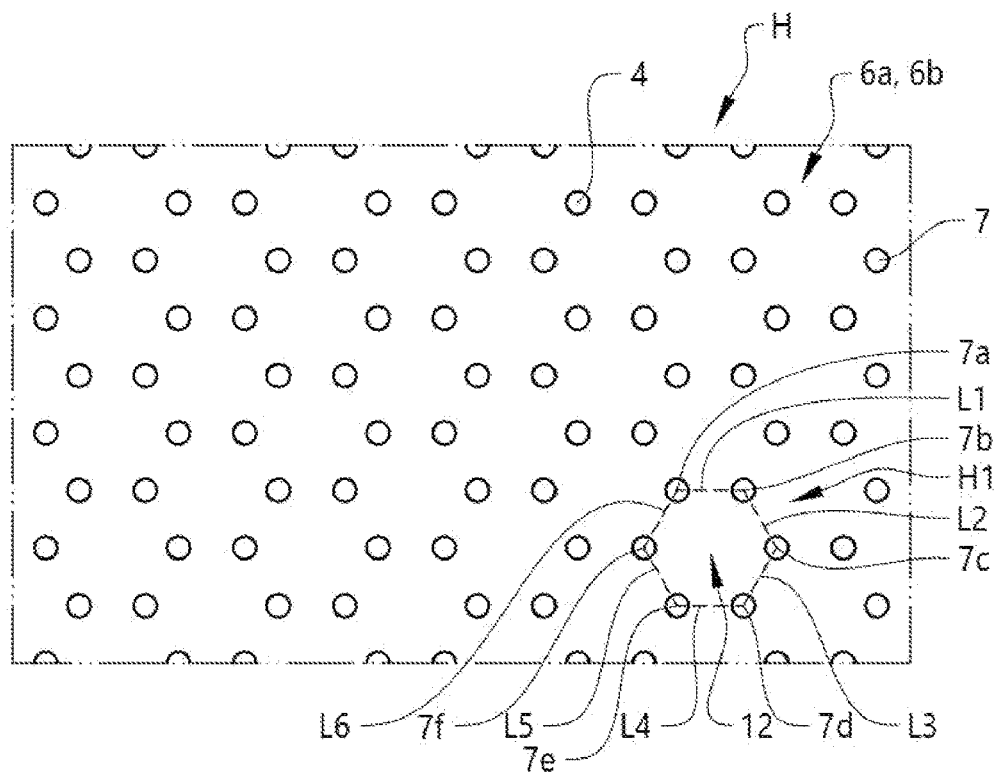
FIG. 5 shows schematically, in a front view, the lens body with a plurality of optical elements pairwise arranged in a hexagonal-shaped pattern according to the disclosure.
Figure 6:
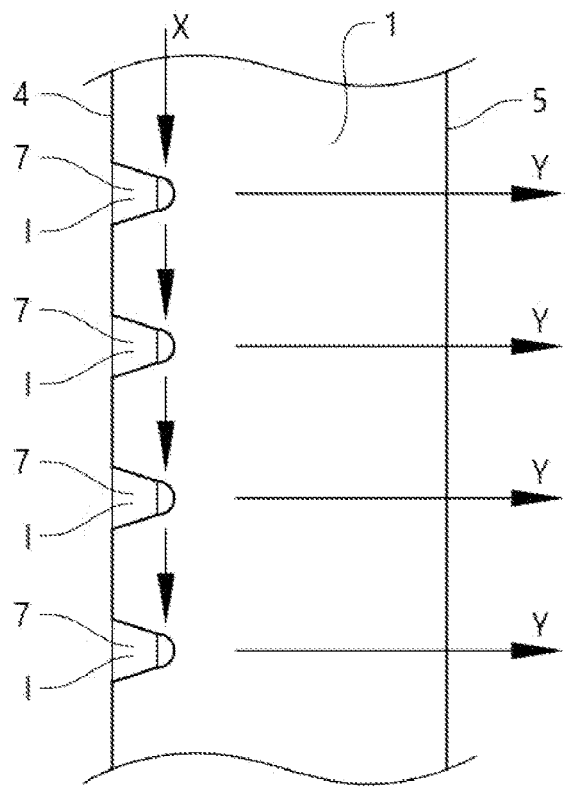
FIG. 6 shows schematically, in a cross-sectional view, a cross-section of the optical lens system with optical elements according to the disclosure.

In the embodiment illustrated in FIGS. 1A-1B, the first optical zone 6a of the light impacting surface 4 is defined by the plurality of optical elements 7, and the plurality of optical elements 7 in the first optical zone 6a are arranged in a hexagonal-shaped pattern H. The hexagonal-shaped pattern is shown more in detail in FIG. 5. The hexagonal-shaped pattern H is formed by pairwise arranged optical elements 7, and as shown in FIGS. 1A and 5, the hexagonal-shaped pattern H is formed by the plurality of optical elements 7 arranged in a repeated continuous hexagonal-shaped pattern. With a hexagonal-shaped pattern H is meant that the optical elements 7 are forming a pattern constituted by a plurality of adjacent hexagons with six sides and six angles, and where an imaginary straight line connecting two of the optical elements forming the hexagon is constituting the side of the hexagon, as schematically shown in FIG. 5. The optical hexagonal-shaped pattern H is suitable for different lighting applications, where a homogeneous look with enough efficiency to fulfill legal requirements is required. The pairwise arrangement is establishing a visually attractive design of the optical zone, and tests have shown that the pairwise arranged optical elements are securing an efficient light distribution. The pairwise arranged optical elements 7 that are forming the hexagonal-shaped pattern H may be arranged to form regular hexagons, where the hexagons are both equilateral and equiangular, or alternative hexagons that are non-regular.

In FIG. 5 a first optical element 7a, a second optical element 7b, a third optical element 7c, a fourth optical element 7d, a fifth optical element 7e, and a sixth optical element 7f are forming a hexagon H1. Imaginary dotted lines in the figure are illustrating the shape of the hexagon H1. A first imaginary dotted line L1 is connecting the first optical element 7a and the second optical element 7b, a second imaginary dotted line L2 is connecting the second optical element 7b and the third optical element 7c, a third imaginary dotted line L3 is connecting the third optical element 7c and the fourth optical element 7d, a fourth imaginary dotted line L4 is connecting the fourth optical element 7d and the fifth optical element 7e, a fifth imaginary dotted line L5 is connecting the fifth optical element 7e and the sixth optical element 7f, and a sixth imaginary dotted line L6 is connecting the sixth optical element 7f and the first optical element 7a. Each hexagon in the hexagonal-shaped pattern H comprises a non-filled area 12, where the non-filled area 12 is configured for establishing a see-through effect in the lens body 1. With non-filled area 12 is meant that this area does not comprise any optical elements 7. The non-filled area 12 illustrated in FIG. 5 is surrounded by the first to sixth optical elements 7a-7e, and the hexagonal-shaped pattern comprises a plurality of hexagons with non-filled areas 12. The non-filled area 12 in each hexagon of the hexagonal-shaped pattern H is arranged as a non-disturbed area and when the lens body 1 is made of a transparent material, it is possible to see through the lens body 1 via the non-filled areas 12. The optical elements 7 are small in relation to the non-filled areas 12 and therefore the see-through effect is established, enabling a visually attractive design of the optical lens system S and at the same time an efficient light distribution. The see-through effect is giving the optical lens system S a three-dimensional appearance, and it is possible to for example arrange graphical elements behind the lens body 1 for an attractive design. The size of the indentations I forming the optical elements 7 in the light impacting surface 4 of the lens body 1 may be varied for different see-through effects. A smaller indentation I will establish a better see-through effect of the lens body 1. Two or more lens bodies 1 may be arranged after each other for establishing sequential and/or animated three-dimensional light patterns, and this is enabled by the see-through effect of the lens body 1 and by sequentially activating different light sources of the combined optical lens systems S.

Figure 3:
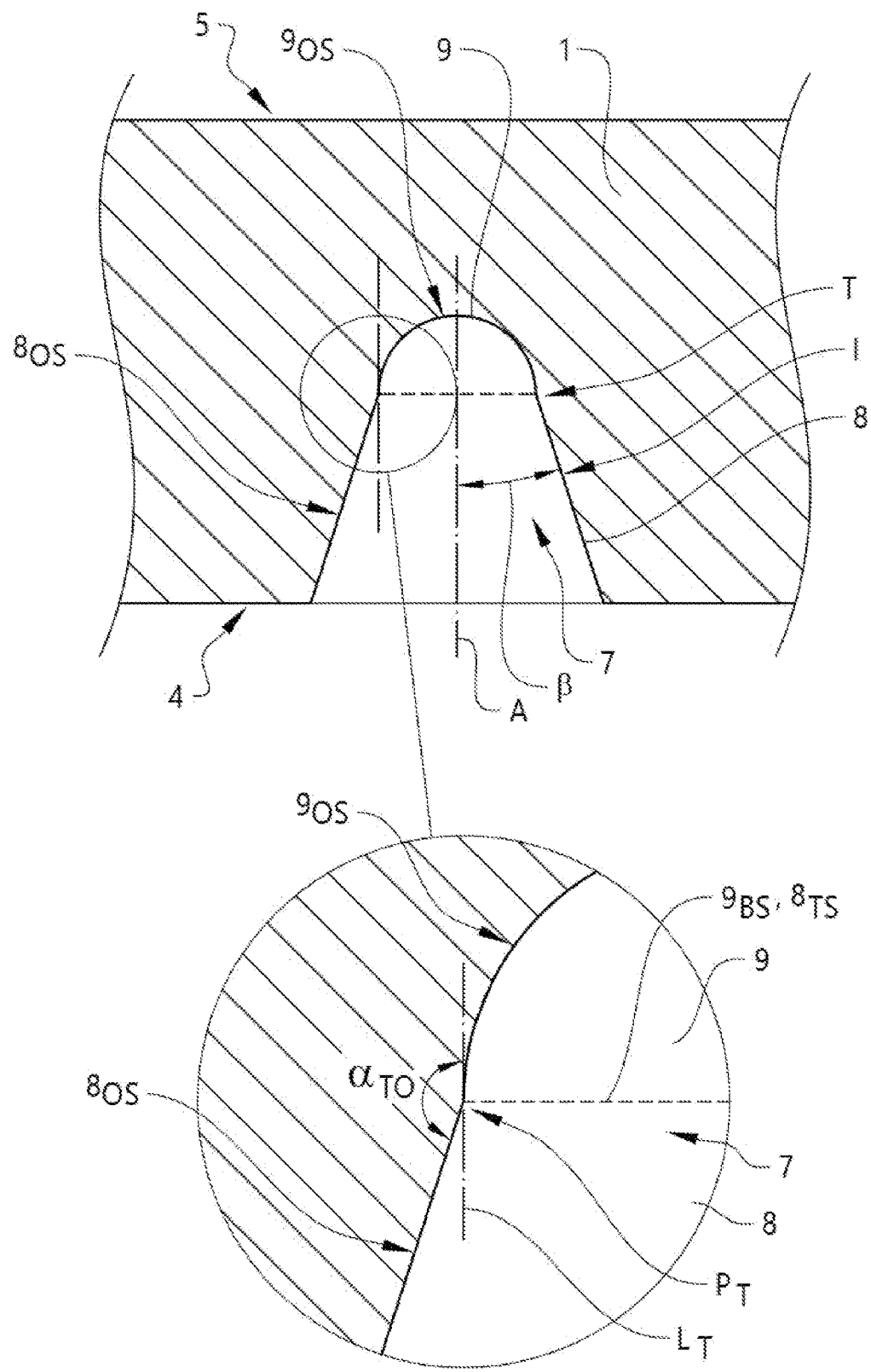
FIG. 3 shows schematically, in a cross-sectional side view, a lens body of the optical lens system with an optical element according to the disclosure.
Figure 4:
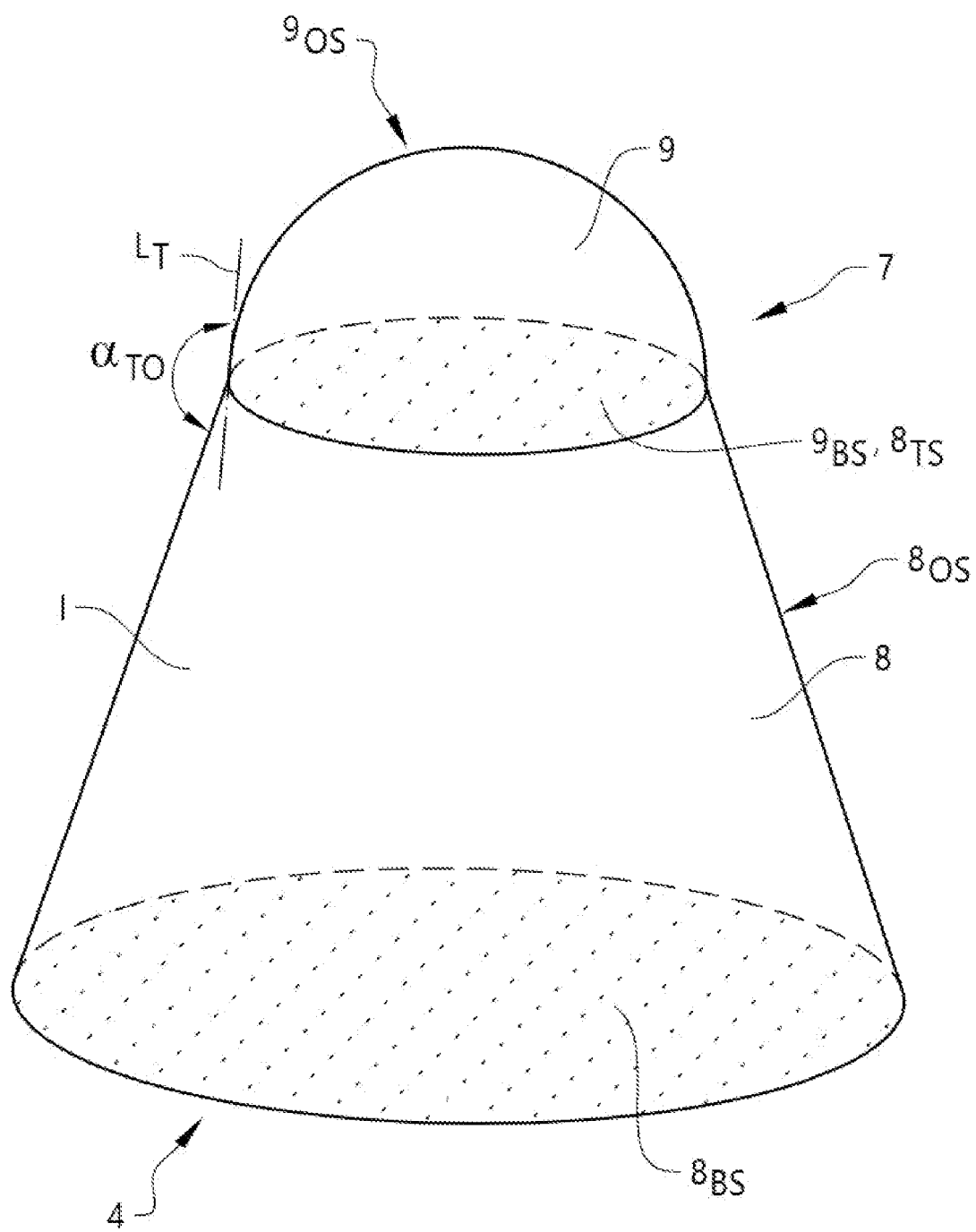
FIG. 4 shows schematically, in a perspective view, the optical element according to the disclosure.

The optical elements 7 are configured with a truncated cone section 8 arranged within the lens body 1 in connection to the light impacting surface 4, and a rounded cap section 9 arranged within the lens body 1 in connection to the truncated cone section 8, as shown more in detail in FIGS. 3 and 4. This configuration of the optical elements 7 has proven to be efficient for redirecting the light from the light source unit. As further illustrated in FIGS. 3 and 4, a base surface $9_{BS}$ of the rounded cap section 9 is coinciding with a top surface $8_{TS}$ of the truncated cone section 8. The truncated cone section 8 comprises an outer surface $8_{OS}$ and the rounded cap section 9 comprises an outer surface $9_{OS}$. With this configuration, the rounded cap section 9 is connected to the truncated cone section 8 and is extending in a direction away from the truncated cone section 8. The truncated cone section 8 is arranged for reflecting the incident light from the light source unit 2*a*. The rounded cap section 9 is arranged for efficiently spreading the light towards the light output surface 5 for a homogenous light distribution from the lens body 1, for establishing a main light flow output in the second light flow direction Y. The ratio between the truncated cone section 8 and the rounded cap section 9 is balancing the light intensity and homogeneity of the light distributed from the lens body 1.

The truncated cone section 8 is defined as a portion of a cone delimited by two planes, where the cone has a three-dimensional geometric shape that tapers from a flat base to an apex point. The base of the cone may any closed one-dimensional figure, such as for example a circle.

In the embodiment illustrated in FIGS. 1A-1B, 3, 4 and 6, the truncated cone section 8 is having a circular base surface 8$_{BS}$ and a circular top surface 8$_{TS}$, and the circular top surface 8$_{TS}$ is arranged within the lens body 1. The truncated cone section 8 may suitably be based on a right circular cone, where the base surface 8$_{BS}$ is circular and the top surface 8$_{TS}$ is circular, and where the truncated cone section 8 comprises an axis A, around which the truncated cone section has a circular symmetry. It should however be understood that the truncated cone section 8 in other non-illustrated embodiments may have other configurations, such as for example a truncated cone section based on an oblique cone.

The rounded cap section 9 is defined as a volume delimited by the base surface 9$_{BS}$ and the outer surface 9$_{OS}$, where the outer surface 9$_{OS}$ has a rounded cross-sectional shape. The outer surface 9$_{OS}$ thus has a cross-sectional shape that is curved and without sharp angles. With cross-sectional shape is meant the shape in a plane arranged perpendicular to the base surface 9$_{BS}$, where the plane is extending through the base surface 9$_{BS}$.

In the embodiment illustrated in FIGS. 1A-1B, 3, 4 and 6, the rounded cap section 9 is arranged as a spherical cap section, and thus based on a sphere. The base surface 9$_{BS}$ of the spherical cap section is circular in shape and is corresponding in shape and size to the top surface 8$_{TS}$ of the truncated cone section 8. It should however be understood that the rounded cap section 9 in other non-illustrated embodiments may have other configurations.

In the following, the optical elements 7 will be described in connection to illustrated embodiments, where the rounded cap section 9 is arranged as a spherical cap section.

A cross-sectional transition T between the outer surface Bos of the truncated cone section 8 and the outer surface 9$_{OS}$ of the spherical cap section 9 is non-linear, as illustrated for example in FIG. 3. In other words, the cross sectional transition T is not forming a straight line. The cross-sectional transition T is defined between the outer surface Bos of the truncated cone section 8, and a tangent line L$_T$ to the outer surface 9$_{OS}$ of the spherical cap section 9 in a transition point P$_T$ where the base surface 9$_{BS}$ of the spherical cap section 9 is coinciding with the top surface 8$_{TS}$ of the truncated cone section 8. The transition point P$_T$ is thus defined as the point in the cross-sectional transition T where the truncated cone section is meeting the spherical cap section, and is determined by the point where the outer surface 8$_{OS}$ of the truncated cone section 8 meets the tangent line L$_T$.

In the embodiment illustrated in FIGS. 1A-1B, 3, 4 and 6, a base surface 8$_{BS}$ of the truncated cone section 8 is arranged in connection to the light impacting surface 4. The base surface 8$_{BS}$ of the truncated cone section 8 has a larger surface area than the top surface 8$_{TS}$ of the truncated cone section 8. The cross-sectional transition T in the illustrated embodiment is suitably measured in a plane perpendicular to the base surface 8$_{BS}$ of the truncated cone section 8, which plane is extending through the axis A.

In other non-illustrated embodiments, the plane may be defined as a plane perpendicular to the base surface of the truncated cone section 8, extending through the base surface of the rounded cap section 9.

The cross-sectional transition T between the outer surface Bos of the truncated cone section 8 and the tangent line L$_T$ is forming an outer transition angle $\alpha_{TO}$ less than 180°, as schematically illustrated in FIGS. 3 and 4. The outer transition angle $\alpha_{TO}$ is as shown in the figures measured on the outer side of the optical element 7, and is defined as the angle between the outer surface 8$_{OS}$ of the truncated cone section 8, and a tangent line L$_T$ to the outer surface 9$_{OS}$ of the spherical cap section 9 in the transition point P$_T$. The outer transition angle $\alpha_{TO}$ may suitably range between 3°-177°, depending on the design of the optical elements based on suitable manufacturing parameters, such as forming mould shapes for the lens body 1. The truncated cone section 8 in the illustrated embodiment has a truncated cone angle β in relation to the axis A, as illustrated in FIG. 3. It should be understood that the outer transition angle $\alpha_{TO}$ may vary depending on the truncated cone angle β as well as the configuration of the spherical cap section 9. The configuration of the spherical cap section 9 will impact the angle of the tangent line L$_T$, and thus also the outer transition angle $\alpha_{TO}$. If the spherical cap section 9 for example is arranged as a hemisphere, the tangent line L$_T$ is parallel to the axis A. If the spherical cap section 9 is smaller or larger than a hemisphere, the tangent line L$_T$ is forming an angle in relation to the axis A. Optical tests of the lens body 1 have shown that the range for the outer transition angle $\alpha_{TO}$ preferably is 113°-177°, and this range is suitable for different materials of the lens body 1, such as for example polymethyl methacrylate (PMMA), polycarbonate (PC), a mix of polycarbonate (PC) and acrylonitrile butadiene styrene (ABS), and silicone. The outer transition angle $\alpha_{TO}$ used for the optical elements 7 may for example be set based on the curvature of the lens body 1 and perceived light quality and light design requests.

Figure 2A:
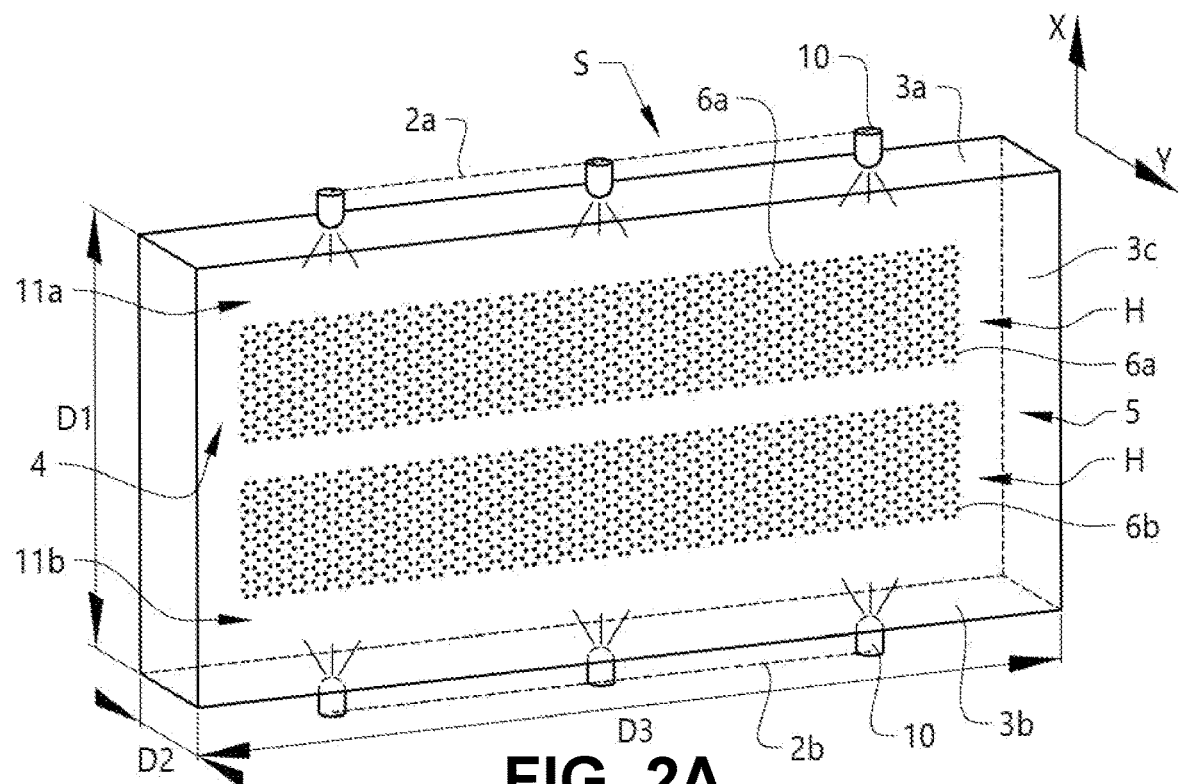
FIGS. 2A-2B show schematically, in a perspective front view and in a side view, an alternative embodiment of the optical lens system according to the disclosure.
Figure 2B:
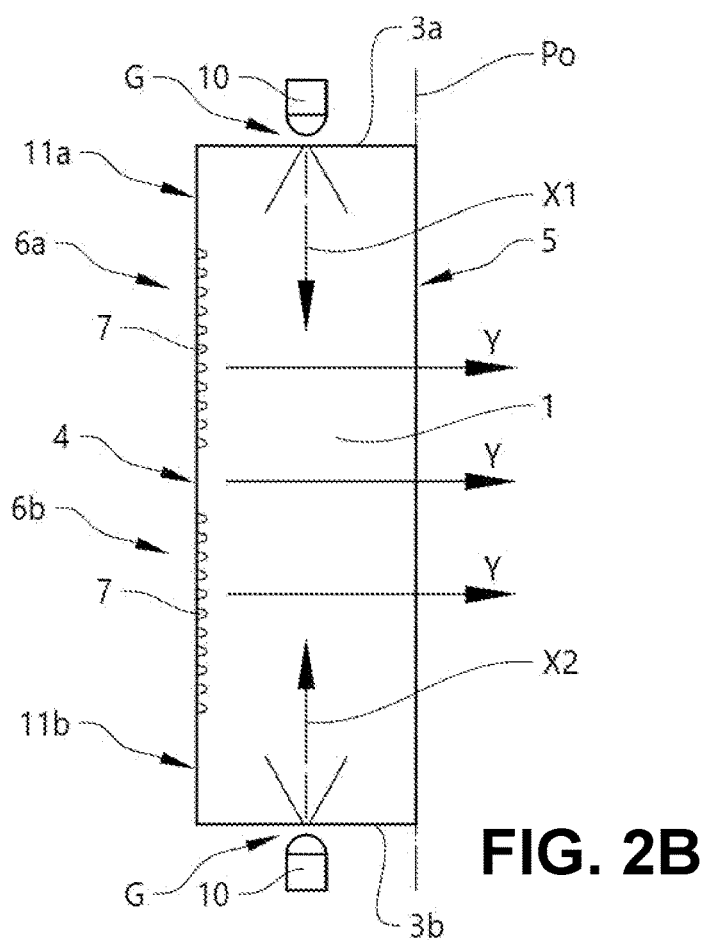

In an alternative embodiment illustrated in FIGS. 2A-2B, the optical lens system S comprises a first light source 2*a* and a second light source 2*b*. The lens body 1 comprises a first light inlet surface 3*a* for the first light source unit 2*a* and a second light inlet surface 3*b* for the second light source unit 2*b*. The first light inlet surface 3*a* and the second light inlet surface 3*b* are oppositely arranged in relation to each other and connected by the light impacting surface 4 and the light output surface 5. The light impacting surface 4 comprises a first optical zone 6*a* and a second optical zone 6*b* formed by the plurality of optical elements 7. As shown in FIGS. 2A-2B, the first optical zone 6*a* is arranged in connection to the first light source unit 2*a*, and the second optical zone 6*b* is arranged in connection to the second light source unit 2*b*.

The first light inlet surface 3*a* is arranged to receive incident light from the first light source unit 2*a*, and the second light inlet surface 3*b* is arranged to receive incident light from the second light source unit 2*b*. The light output surface 5 is configured to emit the light received from the first light source unit 2*a* through the first light inlet surface 3*a*, and the light received from the second light source unit 2*b* through the second light inlet surface 3*b*. As shown in FIGS. 2A-2B, the light impacting surface 4 and the light output surface 5 are oppositely arranged in relation to each other and connected by the first light inlet surface 3a and the second light inlet surface 3b. The light impacting surface 4 is arranged for redirecting the incident light from the first light inlet surface 3a and the second light inlet surface 3b toward the light output surface 5, as will be further described below. In the illustrated embodiment, the first light inlet surface 3a is arranged as an upper surface of the lens body 1 and the second light inlet surface 3b is arranged as a lower surface of the lens body 1. The light impacting surface 4 and the light output surface 5 are connected by two oppositely arranged side surfaces 3c. Upper and lower are in this context referring to the orientation of the surfaces as illustrated in FIGS. 2A-2B. It should be understood that the surfaces may be oriented in other ways if desired. The two side surfaces 3c are arranged as planar surfaces. However, the two side surfaces 3c may have different shapes, and may be arranged as non-planar surfaces. The two side surfaces 3c may further be masked or hidden in a vehicle lighting construction if desired to prevent unnecessary light emissions from the lens body 1.

The lens body 1 may for example have a parallelepiped-like configuration as shown in FIGS. 2A-2B, with a height dimension D1, a width dimension D2, and a length dimension D3. The length dimension D3 may for example be varied to achieve different surface areas of the light output surface 5. If for example, a predetermined height dimension D1 is used in a specific lens body configuration and the length dimension D3 is varied for different designs of the optical lens system S, the light intensities and configurations of the first light source unit 2a and the second light source unit 2b to achieve desired properties may depend on the length dimension D3. It should however be understood that the system may be arranged with other suitable shapes, such as for example curved or irregularly shaped configurations, depending on the design of the vehicle or vehicle component.

The first optical zone 6a and the second optical zone 6b in the embodiment illustrated in FIGS. 2A-2B may suitably have the same configuration as the first optical zone 6a described in the embodiment above in connection to FIGS. 1A-1B. The light impacting surface 4 comprises the first optical zone 6a and the second optical zone 6b formed by the plurality of optical elements 7, and the optical zones are configured for redirecting the incident light from the respective light inlet surfaces toward the light output surface 5. The first light source unit 2a and the second light source unit 2b may be of any type or design, and each of the light source units suitably comprises a plurality of light sources 10 arranged at a distance from each other, in the same way as described for the first light source unit 2a in the embodiment shown in FIGS. 1A-1B. In FIG. 2A, each of the light source units comprises three light sources 10, but the first light source unit 2a and the second light source unit 2b may each comprise only one light source 10, or alternatively two or more light sources 10 depending on the design of the optical lens system S.

As schematically indicated with an arrow in FIG. 2B, the light sources 10 of the first light source unit 2a are emitting light into the first light inlet surface 3a of the lens body 1. The first optical zone 6a of the lens body 1 with the plurality of optical elements 7 is arranged to redirect the incident light from the first light source unit 2a with the light sources 10 from a first light flow direction X1 to a second light flow direction Y. In this way, the optical elements 7 in the first optical zone 6a of the lens body 1 are configured for redirecting the incident light from the first light flow direction X1 to the second light flow direction Y, where the second flow direction Y is arranged at an angle in relation to the first flow direction X1. The lens body 1 is arranged following the first light source unit 2a in the first light flow direction X1.

As schematically indicated with an arrow in FIG. 2B, the light sources 10 of the second light source unit 2b are emitting light into the second light inlet surface 3b of the lens body 1. The second optical zone 6b of the lens body 1 with the plurality of optical elements 7 is arranged to redirect the incident light from the second light source unit 2b with the light sources 10 from a first light flow direction X2 to the second light flow direction Y. In this way, the optical elements 7 in the second optical zone 6b of the lens body 1 are configured for redirecting the incident light from the first light flow direction X2 to the second light flow direction Y, where the second flow direction Y is arranged at an angle in relation to the first flow direction X2. The lens body 1 is arranged following the second light source unit 2b in the first light flow direction X2.

The lens body 1 is designed and configured so that an even or homogenous light distribution of the light emitted from the light sources 10 of the first light source unit 2a and the second light source unit 2b is achieved. As described above, the lens body 1 comprises the first light inlet surface 3a, the second light inlet surface 3b, and the light output surface 5. The first light inlet surface 3a and the second light inlet surface 3b are arranged to receive the incident light from the light sources 10. The light output surface 5 is arranged to emit the light received from the light sources 10 through the first light inlet surface 3a and the second light inlet surface 3b. The light output surface 5 is distributing the emitted light for example to the outside of the vehicle or into the interior compartment of the vehicle. The optical lens system S may further comprise protective sheets, such as an outer lens covering the light output surface 5.

The light emitted from the plurality of light sources 10 of the first light source unit 2a is thus redirected from the respective first light flow directions X to the second light flow direction Y in the lens body 1, and through the redirection of light flow, a compact design of the optical lens system S is enabled.

Each light source 10 is suitably arranged at a small distance from the respective light inlet surfaces, as illustrated in for example FIGS. 2A-2B. A small gap G is thus arranged between each light source 10 and the respective light inlet surface, as indicated in FIG. 2B. In alternative non-illustrated embodiments, the light sources may instead be arranged in direct contact with the first light inlet surface 3a or embedded within the first light inlet surface 3a. Instead of a plurality of light sources, a light guide or similar arrangement may be used as the first light source unit 2a. The use of a light guide may reduce the number of light sources used.

As described above in connection to FIGS. 1A-1B, the first optical zone 6a and the second optical zone 6b are formed by the plurality of optical elements 7, and in this way the extension of the first optical zone 6a and the second optical zone 6b are determined by the optical elements 7. The optical elements 7 are arranged as indentations I in the light impacting surface 4 of the lens body 1, and each optical element 7 is thus forming a cavity in the lens body 1. The indentations I formed by the optical elements 7 in the lens body 1 can be achieved when moulding the lens body 1, and the mould used is then prepared with mould structures. The optical elements in the embodiment illustrated in FIGS. 2A-2B are having the same shape and configuration as described in connection to the embodiment illustrated in FIGS. 1A-1B, and shown more in detail in FIGS. 3 and 4.

As shown in FIGS. 2A-2B, the first optical zone 6a is arranged in connection to the first light source unit 2a, and in this embodiment the lens body 1 comprises a first buffer zone 11a between the first light inlet surface 3a and the first optical zone 6a. The first buffer zone 11a is arranged for securing that the incident light is evenly spread in the lens body 1 before being redirected in the first optical zone 6a. The area between the first light inlet surface 3a and the first optical zone 6a is defining the first buffer zone 11a, and the first buffer zone 11a may vary in size and shape depending on the design of the lens body 1. The second optical zone 6b is arranged in connection to the second light source unit 2b, and in this embodiment the lens body 1 comprises a second buffer zone 11b between the second light inlet surface 3b and the second optical zone 6b. The second buffer zone 11a is arranged for securing that the incident light is evenly spread in the lens body 1 before being redirected in the second optical zone 6b. The area between the second light inlet surface 3b and the second optical zone 6b is defining the second buffer zone 11b, and the second buffer zone 11b may vary in size and shape depending on the design of the lens body 1.

In the embodiment illustrated in FIGS. 2A-2B, the first optical zone 6a and the second optical zone 6b of the light impacting surface 4 are defined by the plurality of optical elements 7, and the plurality of optical elements 7 in the first optical zone 6a and the second optical zone 6b are arranged in a hexagonal-shaped pattern H. With a hexagonal-shaped pattern H is meant that the optical elements 7 are forming a pattern constituted by a plurality of adjacent hexagons with six sides and six angles, and where an imaginary straight line connecting two of the optical elements forming the hexagon is constituting the side of the hexagon, as schematically shown in FIG. 5. The hexagonal-shaped pattern H is formed by pairwise arranged optical elements 7, and the hexagonal-shaped pattern H is formed by the plurality of optical elements 7 arranged in a repeated continuous hexagonal-shaped pattern. Each hexagon in the hexagonal-shaped pattern H comprises a non-filled area 12, wherein the non-filled area 12 is configured for establishing a see-through effect in the lens body 1. The hexagonal-shaped pattern of the first optical zone 6a and the second optical zone 6b suitably have the same configurations as the hexagonal-shaped pattern described in connection to the embodiment illustrated in FIGS. 1A-1B, and FIG. 5.

In the different embodiments of the optical lens system S, for achieving an even light distribution with an even light pattern in the lens body 1, the suitable number of light sources 10 used in each light source unit is depending on the surface area of the light output surface 5. The larger area of the light output surface 5, the higher number of light sources 10 may be used. The light sources 10 used in each light source unit may be any suitable light sources for vehicle applications, such as for example light-emitting diodes (LED) having a low energy consumption, a long lifetime and a robust construction.

The first light inlet surface 3a and/or the second light inlet surface 3b may have a planar configuration or an essentially planar configuration. The respective light inlet surfaces may be provided with light inlets for the one or more light sources 10. In alternative non-illustrated embodiments, the first light inlet surface 3a and the second light inlet surface 3b are having non-planar configurations, with for example curved or shaped surface structures. The light output surface 5 may have a planar configuration or an essentially planar configuration for an even light distribution, as shown in for example FIGS. 1A and 2A. In alternative non-illustrated embodiments, the light output surface 5 is having a non-planar configuration, with for example a curved or shaped surface structure. The light impacting surface 4 is as described above arranged for internally redirecting the incident light from each light inlet surface toward the light output surface 5. The light impacting surface 4 may have a planar or non-planar configuration.

In the different embodiments of the optical lens system S, the light output surface 5 is arranged in a light output plane $P_O$, as for example shown in FIGS. 1A and 2A. The light output plane $P_O$ may be used for defining the second light flow direction Y, where the second light flow direction Y is a direction perpendicular to the light output plane $P_O$. The first light flow direction X is a direction of the light entering the lens body 1 through each light inlet surface from the respective light source unit. It should be understood that light emitted from each of the light source units is emitted not only in one single direction, but in different directions within a light emission angle or viewing angle of the light source. Different light sources are having different radiation patterns, and an example of a typical radiation pattern for a light emitting diode (LED) is where most of the energy is emitted within 20° of the direction of maximum light. A maximum light direction for a light source may for example be used to define the first light flow direction X. Different types of light emitting diodes may be used for the light sources 10, and suitable light emitting diodes used in the automotive industry may typically have viewing angles of 60° and/or 120°.

In the different embodiments illustrated in FIGS. 1B and 2B, the first light flow direction X is arranged at about an angle of 90° in relation to the second light flow direction Y. However, it should be understood that the lens body 1 may be arranged to redirect the incident light in other angles than about 90° between the first light flow direction X and the second light flow direction Y. The first light flow direction X and the second light flow direction Y may be arranged in any desired angular relationship relatively each other, and the angle may be different for different designs of the optical lens system S.

In the different embodiments of the optical lens system S, the lens body 1 may be made of any suitable material, such as for example polymethyl methacrylate (PMMA), polycarbonate (PC), a mix of polycarbonate (PC) and acrylonitrile butadiene styrene (ABS), or any other suitable plastic or other material having transparent properties. Another suitable material for forming flexible lens body structures is silicone, where the lens body could be moulded into a desired shape structure from silicone in a forming mould. Depending on the material or materials used, the angles or angle ranges used may be different from the ones described depending on the optical properties and refractive index of the material used.

In the different embodiments, the light output surface 5 may for example comprise a graining structure or other surface finish layer for a more even light distribution. The graining structure may be of any suitable texture or coarseness. If the lens body 1 is made of a suitable plastic material, such as for example polymethyl methacrylate (PMMA), the graining of the light output surface 5 can be measured for example according to the VDI 3400 standard. The graining structure can be achieved when moulding the lens body 1, and the mould used is then prepared with a suitable graining structure.

The optical lens system S, can through the construction of the lens body 1 and the light sources 10 be scalable in size. Through the scalability of the optical lens system S, the dimension of the lens body 1 may be varied, and further the number of light sources 10 used may differ between different vehicle lighting applications. The distance between the light sources 10 can be varied to alter the intensity of the light emitted from the light output surface 5. The more the light sources 10 are separated, the higher risk for an uneven light pattern in the light output surface 5. Further, if the light sources are arranged too close to each other the optical lens system S may not be energy efficient enough. A narrow system may only need one light source 10 and wider systems may need two or more light sources 10.

The first light inlet surface 3a and/or the second light inlet surface 3b of the lens body 1 may comprise one or more lenses arranged to direct the light emitted from the one or more light sources 10 into the lens body 1. The first light inlet surface 3a and/or the second light inlet surface 3b may be provided with one lens for each light source, where the lenses are arranged to direct and distribute the light emitted from the one or more light sources 10 in a suitable manner into the lens body 1 in order to achieve a desired first light flow direction X into the lens body 1. The more light reflected on the optical elements 7, the better light output is accomplished through the light output surface 5. Each of the one or more light sources 10 is cooperating with one of the one or more lenses, and thus the lens body 1 may be provided with one lens for each light source 10. The lenses may be configured in different ways depending on the design of the system. The one or more lenses may be attached as separate elements to the lens body 1 or alternatively be moulded into the structure of the lens body 1.

In a non-limiting example embodiment, the lens body 1 may have a width dimension D2 of at least 1 mm, and the height dimension D1 and length dimension D3 may vary depending on the specific vehicle lighting application in which the system is used. The distance between the light sources 10 used is depending on the dimensions of the lens body 1 and the light intensities of the light sources used.

Figure 8A:
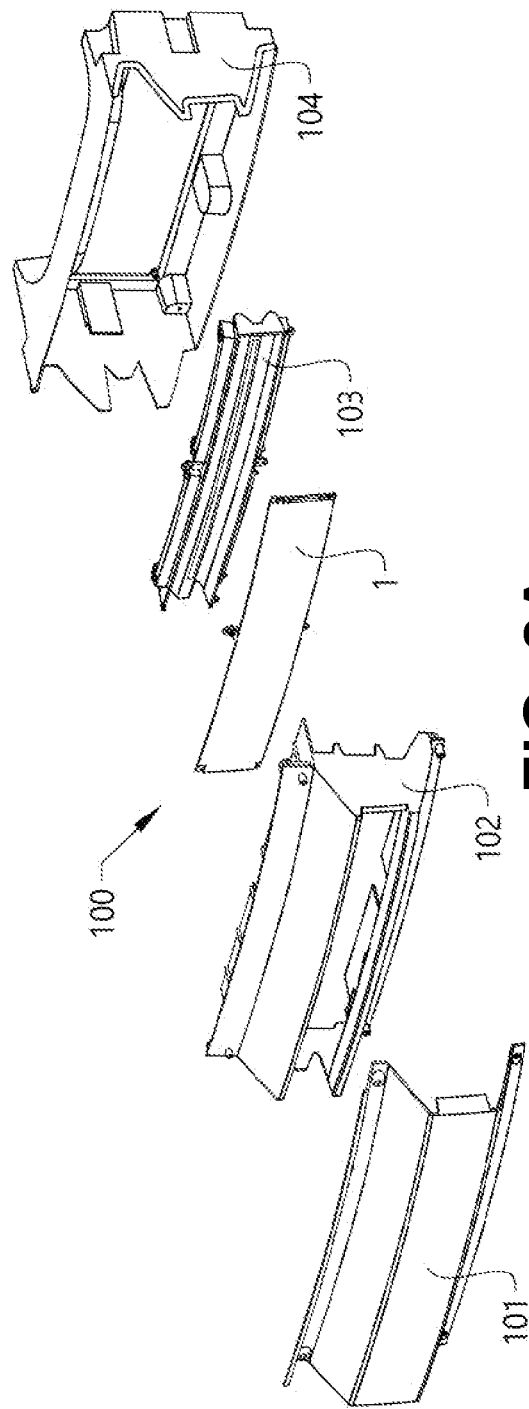
FIGS. 8A-8B show, schematically in exploded views, embodiments of a vehicle lighting unit with the lens body according to the disclosure.
Figure 8B:
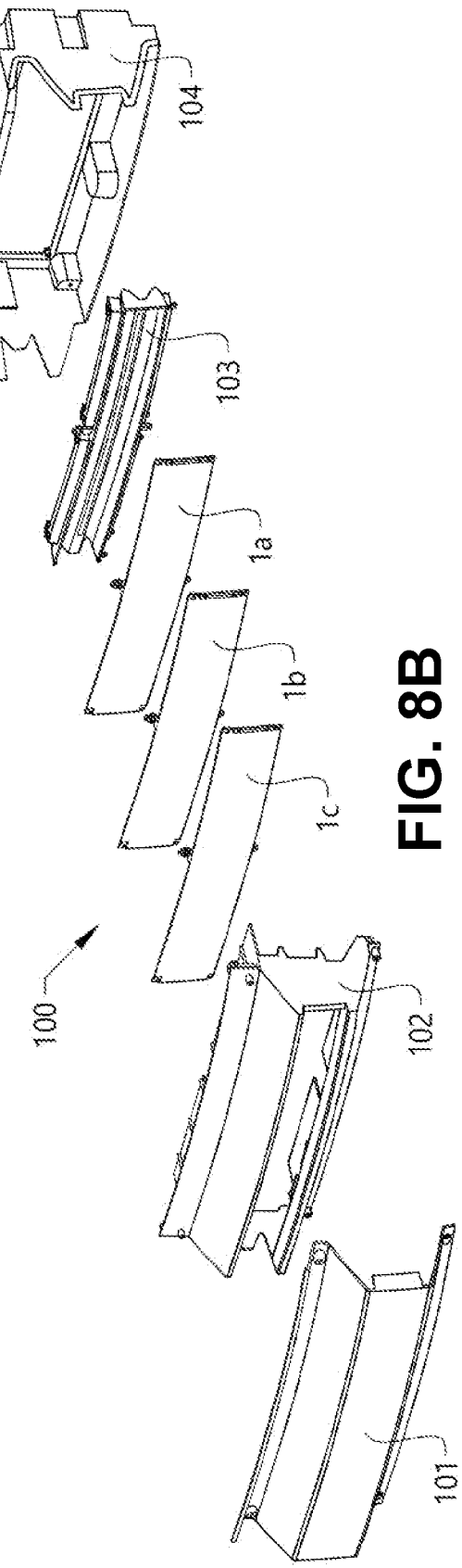

The optical lens system S may form part of a vehicle lighting unit 100, as schematically shown in exploded views in FIGS. 8A-8B. In the embodiment illustrated in FIG. 8A, the vehicle lighting unit 100 comprises the optical lens system S, where the optical lens system S may have the configurations described above. The vehicle lighting unit 100 further comprises an outer lens 101, being part of for example the exterior surface, such as a taillight or position light. Alternatively, the outer lens 101 is facing the interior compartment of the vehicle. The outer lens 101 is suitable made of a clear or transparent material and may be coloured if desired. The lens body 1 is arranged inside of the outer lens 101, with an outer bezel structure 102 positioned between the lens body 1 and the outer lens 101. The outer bezel structure 102 may be configured as a framing structure that is establishing a distance between the lens body 1 and the outer lens 101. An inner bezel structure 103 may be provided behind the lens body 1 for an attractive design of the vehicle lighting unit 100, and the inner bezel structure 103 may be shaped or arranged with graphics. The different parts of the vehicle lighting unit 100 may suitably be arranged in a housing structure 104 or similar structure for a robust construction of the vehicle lighting unit 100.

The embodiment illustrated in FIG. 8B is similar to the vehicle lighting unit 100 in FIG. 8A. The vehicle lighting unit 100 in this embodiment comprises three optical lens systems S, where the respective optical lens systems S may have the configurations described above. The vehicle lighting unit 100 further comprises an outer lens 101, being part of for example the exterior surface, such as a taillight or position light. Alternatively, the outer lens 101 is facing the interior compartment of the vehicle. The outer lens 101 is suitable made of a clear or transparent material and may be coloured if desired. A first lens body 1a, a second lens body 1b, and a third lens body 1c are arranged after each other inside of the outer lens 101, with an outer bezel structure 102 positioned between the outer lens 101 and the third lens body 1c. The respective lens bodies are positioned after each other with a distance in-between for establishing sequential and/or animated three-dimensional light patterns. The outer bezel structure 102 may be configured as a framing structure that is establishing a distance between the third lens body 1c and the outer lens 101. An inner bezel structure 103 may be provided behind the first lens body 1a for an attractive design of the vehicle lighting unit 100, and the inner bezel structure 103 may be shaped or arranged with graphics. The different parts of the vehicle lighting unit 100 may suitably be arranged in a housing structure 104 or similar structure for a robust construction of the vehicle lighting unit 100. The arrangement of three lens bodies after each other for establishing sequential and/or animated three-dimensional light patterns is enabled by the see-through effect of the lens body, and by sequentially activating different light sources of the combined optical lens systems S. It should be understood that any suitable number of optical lens systems S with lens bodies may be used for establishing the sequential and/or animated three-dimensional light patterns, such as two lens bodies, three lens bodies, or four or more lens bodies arranged after each other.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Lens body
2a: First light source unit
2b: Second light source unit
3a: First light inlet surface
3b: Second light inlet surface
3c: Side surface
3d: Lower surface
4: Light impacting surface
5: Light output surface
6a: First optical zone
6b: Second optical zone 7: Optical element
8: Truncated cone section
$B_{BS}$: Base surface, Truncated cone section
$8_{OS}$: Outer surface, Truncated cone section
$8_{TS}$: Top surface, Truncated cone section
9: Rounded cap section
$9_{BS}$: Base surface, Rounded cap section
$9_{OS}$: Outer surface, Rounded cap section
10: Light source
11a: First buffer zone
11b: Second buffer zone
12: Non-filled area
100: Vehicle lighting unit
101: Outer lens
102: Outer bezel structure
103: Inner bezel structure
104: Housing structure
A: Axis
D1: Height dimension
D2: Width dimension
D3: Length dimension
$\alpha_{TO}$: Outer transition angle
β: Truncated cone angle
G: Gap
H: Hexagonal-shaped pattern
$L_T$: Tangent line
$P_O$: Light output plane
$P_T$: Transition point
S: Optical lens system
T: Cross-sectional transition

What is claimed is:

1. An optical lens system for vehicle lighting applications, wherein the system comprises a lens body and a first light source unit configured for emitting light into the lens body,
    wherein the lens body comprises a first light inlet surface arranged to receive incident light from the first light source unit, a light output surface configured to emit the light received from the first light source unit through the first light inlet surface, and a light impacting surface, wherein the light impacting surface and the light output surface are oppositely arranged in relation to each other and connected by the first light inlet surface,
    wherein the light impacting surface comprises at least one first optical zone configured for redirecting the incident light from the first light inlet surface toward the light output surface, wherein the at least one first optical zone is formed by a plurality of optical elements, wherein the optical elements are arranged as indentations in the light impacting surface of the lens body,
    wherein the optical elements are configured with a truncated cone section arranged within the lens body in connection to the light impacting surface, and a rounded cap section arranged within the lens body in connection to the truncated cone section, wherein a base surface of the rounded cap section is coinciding with a top surface of the truncated cone section, wherein the truncated cone section comprises an outer surface and a base surface, and the rounded cap section comprises an outer surface, wherein a cross-sectional transition between the outer surface of the truncated cone section and the outer surface of the rounded cap section is non-linear.

2. The optical lens system according to claim 1, wherein the cross-sectional transition between the outer surface of the truncated cone section, and a tangent line to the outer surface of the rounded cap section in a transition point where the base surface of the rounded cap section is coinciding with the top surface of the truncated cone section, is non-linear.

3. The optical lens system according to claim 2, wherein the cross-sectional transition between the outer surface of the truncated cone section and the tangent line is forming an outer transition angle less than 180°.

4. The optical lens system according to claim 3, wherein the outer transition angle is in the range of 3°-177°.

5. The optical lens system according to claim 1, wherein the base surface of the truncated cone section is arranged in connection to the light impacting surface.

6. The optical lens system according to claim 1, wherein the rounded cap section is configured as a spherical cap section.

7. The optical lens system according to claim 1, wherein the truncated cone section is having a circular base surface and a circular top surface, wherein the circular top surface is arranged within the lens body.

8. The optical lens system according to claim 1, wherein the optical elements are configured for redirecting the incident light from a first light flow direction to a second light flow direction.

9. The optical lens system according to claim 1, wherein the system comprises the first light source and a second light source, wherein the lens body comprises the first light inlet surface for the first light source unit and a second light inlet surface for the second light source unit, wherein the first light inlet surface and the second light inlet surface are oppositely arranged in relation to each other and connected by the light impacting surface and the light output surface, wherein the light impacting surface comprises a first optical zone and a second optical zone formed by the plurality of optical elements.

10. The optical lens system according to claim 9, wherein the first optical zone is arranged in connection to the first light source unit, and the second optical zone is arranged in connection to the second light source unit.

11. The optical lens system according to claim 1, wherein the first optical zone of the light impacting surface is defined by the plurality of optical elements, wherein the plurality of optical elements in the first optical zone are arranged in a hexagonal-shaped pattern; or
    wherein the first optical zone and the second optical zone of the light impacting surface are defined by the plurality of optical elements, wherein the plurality of optical elements in the first optical zone and the second optical zone are arranged in a hexagonal-shaped pattern.

12. The optical lens system according to claim 11, wherein the hexagonal-shaped pattern is formed by pairwise arranged optical elements.

13. The optical lens system according to claim 11, wherein the hexagonal-shaped pattern is formed by the plurality of optical elements arranged in a repeated continuous hexagonal-shaped pattern.

14. The optical lens system according to claim 11, wherein each hexagon in the hexagonal-shaped pattern comprises a non-filled area, wherein the non-filled area is configured for establishing a see-through effect in the lens body.

15. The optical lens system according to claim 1, wherein the lens body comprises a first buffer zone between the first light inlet surface and the first optical zone; or
    wherein the lens body comprises a first buffer zone between the first light inlet surface and the first optical zone, and a second buffer zone between the second light inlet surface and the second optical zone.

16. The optical lens system according to claim 1, wherein each light source unit comprises a plurality of light sources.

17. A vehicle comprising an optical lens system according to claim 1.

18. A vehicle lighting unit comprising one or more optical lens systems according to claim 1.

19. A vehicle lighting unit according to claim 18 comprising two or more optical lens systems, wherein lens bodies of the optical lens systems are arranged after each other and configured for establishing sequential and/or animated three-dimensional light patterns.

20. The optical lens system according to claim 3, wherein the outer transition angle is in the range of 113°-177°.

* * * * *